United States Patent [19]

Pennington

[11] 4,454,549
[45] Jun. 12, 1984

[54] SLANT TRACK SECTOR SERVO

[75] Inventor: Dale H. Pennington, Los Gatos, Calif.

[73] Assignee: International Business Machines Corporation, Armonk, N.Y.

[21] Appl. No.: 392,836

[22] Filed: Jun. 28, 1982

[51] Int. Cl.³ .............................................. G11B 5/58
[52] U.S. Cl. ................................................... 360/77
[58] Field of Search ................................... 360/77, 78

[56] References Cited

U.S. PATENT DOCUMENTS

| | | | |
|---|---|---|---|
| 3,725,861 | 4/1973 | Hancock | 340/146.1 F |
| 3,864,741 | 2/1975 | Schwarz | 360/77 |
| 4,048,660 | 9/1977 | Dennison et al. | 360/77 |
| 4,157,577 | 6/1979 | Porter, Jr. et al. | 360/77 |

FOREIGN PATENT DOCUMENTS 2364784 7/1975 Fed. Rep. of Germany ........ 360/77

OTHER PUBLICATIONS

T. M. Paska, Digital Track Position Information Recording System, vol. 20, No. 12, May 1978, pp. 5272-5280, IBM-TDB.

Primary Examiner—George G. Stellar
Attorney, Agent, or Firm—Walter J. Madden, Jr.

[57] ABSTRACT

A sector servo system for a magnetic disk file employs servo signals in the sectors which are recorded at a slant relative to the data tracks. Using digital techniques, the slanted servo tracks produce information relative to the amount and direction of the displacement of the disk file magnetic head from the centerline of a data track for use in a track following servo system.

4 Claims, 4 Drawing Figures

U.S. Patent   Jun. 12, 1984   4,454,549
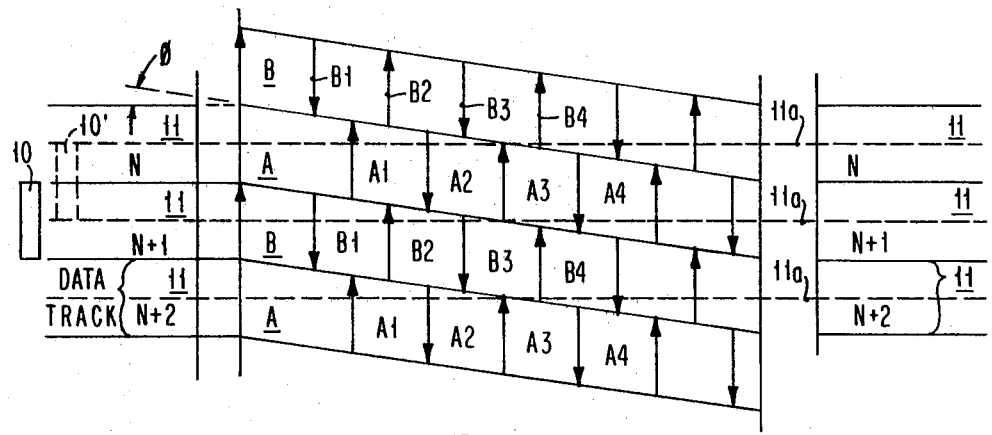
FIG.1
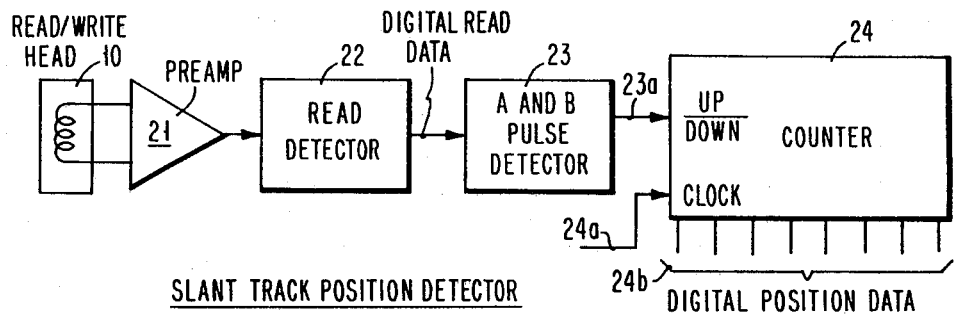
SLANT TRACK POSITION DETECTOR
FIG.2
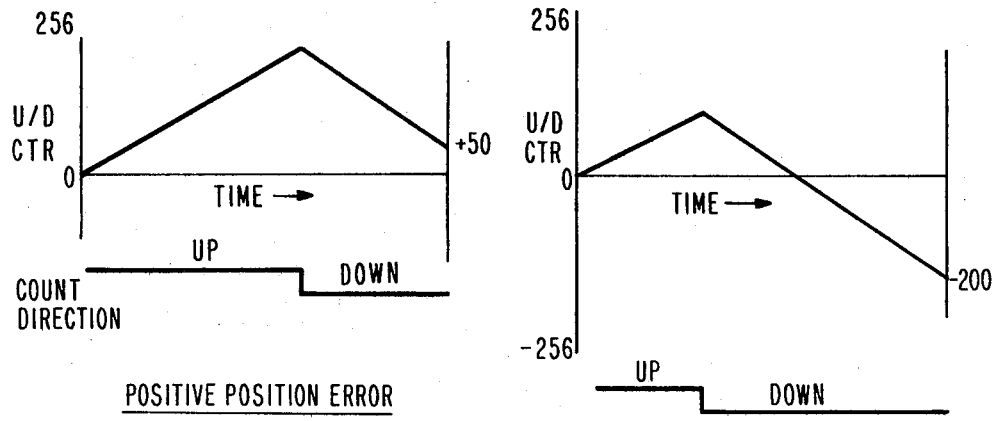
POSITIVE POSITION ERROR
FIG.3A
NEGATIVE POSITION ERROR
FIG.3B

SLANT TRACK SECTOR SERVO

DESCRIPTION

BACKGROUND OF THE INVENTION

1. Field of the Invention

The present invention relates to servo positioning systems in which only sampled position data is available for feedback control.

2. Description of Prior Art

A typical positioning application to which the present invention can be applied is in connection with maintaining a magnetic head centered on information-bearing concentric tracks in a magnetic disk file of the so-called "sector-servo" type. In such a file, servo position reference information is recorded in a plurality of spaced sectors interleaved between larger sectors on which the data is recorded. An advantage of such a system is that the servo information is contiguous with the recorded data so that the data tracks of interest can be followed with greater accuracy than with a separate dedicated servo surface and thus packed closer together. The servo sectors must be sampled at times defined by clock signals to enable a position error to be generated for track following purposes.

In some sector servo systems, the servo tracks in the sector portions are in the form of blocks of servo information, one set of blocks on one track being identified as block A signals and an adjacent track contains blocks identified as block B signals. The boundary between adjacent servo blocks is aligned with a data track center in the following data portion of the disk. Track following to maintain the head positioned over the data track center is accomplished by positioning the head near the desired location (by track accessing circuitry which does not form part of the present invention) and then reading and comparing the signals recorded in the servo blocks on adjacent servo tracks in the sector. When the head is located over the data track center, it will receive equal signals from block A signals and block B signals, and integration of the energy level of the signals and the comparison of these energy levels will result in a null condition, indicating that the head is located on the data track centerline. If the head is located off the data track centerline, the head will be located over more of one type of servo block than the other adjacent type so that the signals from the two types of blocks will not be equal, and energy integration and comparison of the two types of signals will result in the generation of a position error signal (PES) which can be used in the servo system to move the head toward the proper position over the data track centerline.

In sector servo systems, the servo information detected during reading of the servo information is stored and utilized during the interval that the head is over the subsequent data portion of the record to maintain the head over the data track centerline.

PRIOR ART

U.S. Pat. No. 3,725,861, Hancock, shows a disk file having a separate servo disk and having record tracks which contain portions of clock synchronization information, and portions of track descriptor information indicating a defective or defect-free data portion.

U.S. Pat. No. 4,048,660. Dennison et al, shows another servo system wherein some of the signal patterns (FIG. 3) are incidentally centered on a data track (item 117).

U.S. Pat. No. 3,864,741, Schwarz, shows inserting a special sector in servo tracks in a dedicated servo circuit.

IBM Technical Disclosure Bulletin, Vol. 20, No. 12, May 1978, pp5272-5278 shows a sector servo system for a disk file in which Maximum Length Code (MLC) signals are utilized to provide track following information. These MLC signals are staggered in position relative to the data tracks.

SUMMARY OF THE INVENTION

In accordance with the present invention, a sector servo pattern is provided which can be detected using digital logic without the need for further analog circuitry. In this pattern, A and B sector servo blocks are written at a slight angle to the data tracks in each sector. When these servo tracks are read by the head which also reads the data track information, the A and B servo block signals are detected and using digital logic and techniques, the amount and direction of any off-track position can be determined and utilized for track following control of the servo during the subsequent data portion to maintain the head over the data track centerline.

BRIEF DESCRIPTION OF THE DRAWINGS

FIG. 1 is a representation of the layout of a portion of a disk file servo sector showing the relationship between the data tracks and the servo tracks;

FIG. 2 shows one form of circuitry for implementing the servo detection method of the present invention;

FIG. 3A represents the output of the circuitry of FIG. 2 when a positive position error signal is generated; and FIG. 3B shows the output of the circuitry of FIG. 2 when a negative error signal is generated.

DESCRIPTION OF THE PREFERRED EMBODIMENT

FIG. 1 illustrates a portion of a disk file servo sector in accordance with the present invention. A plurality of data tracks 11 are provided, tracks 11 being adjacent to each other and identified as tracks N, track N+1, etc. The data tracks and servo tracks are read by a magnetic head 10 which is movable under the control of the servo system to be positioned over the desired data track and maintained in that position. Preceding each group of data tracks 11 is a sector of servo information. The servo information is in the form of blocks of servo signals in adjacent tracks, these servo blocks being offset from each other along the servo track length. As shown, the servo signals include blocks of one type of signal, identified as servo block A signals, and blocks of another type of servo signal identified as servo block B signals. Servo block A signals are spaced from each other along the servo track, as are the blocks of servo block B signals. Each block A signal abuts a block B signal in an adjacent track.

As indicated above, the servo system operates to sense the signals in block A and block B tracks in each servo sector and attempts to position the magnetic head so as to balance the energy levels of the signals from these blocks to produce a null condition which should indicate that the head is positioned over a data track centerline 11a. The information detected by the servo system during the reading of a servo sector is stored and used to control the position of head 10 while it is passing over the following data portion of the disk.

It will be understood that in addition to the data and servo portions shown in FIG. 1, each track may also contain additional information such as clock synchronization signals, address and error correction information, as is well known in the art.

In accordance with the present invention, the A and B servo tracks are written at a slant relative to the data tracks N, this slant being represented in FIG. 1 by the angle $\phi$. Each of the A and B servo tracks have alternating magnetic transitions therein, the magnetic transitions in any one servo track being offset along the track relative to transitions in either adjacent track. This is shown by the positions of the transitions A1, A2, A3, etc. for the A tracks relative to the transitions B1, B2, B3, etc. for the B tracks.

At the beginning of each servo sector, the centerline of each servo track is aligned with the centerline of a data track, and at the end of the servo sector, the servo tracks are aligned with the centerline of a different data track because of the slant of the servo tracks. Thus, the upper servo track A in FIG. 1 is aligned with the centerline of data track N at its beginning and is aligned with data track N+1 at its end.

If the head 10 is positioned exactly over the centerline of data track N+1 as shown in FIG. 1, as the servo field begins to pass under the head, the head first encounters full amplitude transitions written on slant track B. Midway through the servo field it encounters half amplitude transitions from slant tracks A and B, and finally, as it leaves the pattern it encounters full amplitude transitions from slant track A.

Moving the head "off-track" in the direction of slant track A causes the half amplitude A and B pulse pattern to be encountered nearer the beginning of the pattern. Conversely, the half amplitude A and B pulse pattern will move nearer the end of the pattern as the head is moved offtrack in the direction of slant track B. The effect of moving the head offtrack is to cause a time change of when the head encounters the half amplitude A and B pulse pattern.

If the field of the A and B slant track patterns is divided into units of time, then a linear relationship exists between head position on a track and the time occurrence of the A and B half amplitude pulses. Head position on a track then can be expressed in terms of a digital time measurement directly.

FIG. 2 illustrates one embodiment of circuitry which may be employed to implement the present invention. The read signal from head 10 is supplied through a preamplifier 21 to a read detector 22. The output of read detector 22 is supplied to detector circuitry which supplies a signal on output line 23a indicative of each servo pulse detected. Line 23a is supplied to the input of an up/down counter 24. Counter 24 is started at the beginning of a servo sector by a clock signal on input 24a. Assuming that the head is positioned over the centerline of the data track N+1 as shown in FIG. 1, as the B track pulses are encountered, counter 24 begins counting up. As soon as both A and B track pulses are encountered, counter 24 is reversed and begins counting down. When the A track pulses have completely passed under head 10, counter 24 is stopped.

When head 10 is positioned over the centerline of a track such as track N+1 as shown in FIG. 1, counter 24 will count up for the first half of the servo sector and will count down for the second half of the servo sector, resulting in a zero count when counter 24 is stopped at the end of the A track pulses, thereby indicating zero position error.

However, if head 10 is positioned off the centerline of track N+1 to the position shown in the phantom outline 10' in FIG. 1, head 10 will encounter A track pulses for more than the first half of the servo sector and counter 24 will continue to count up. When both A track pulses and B track pulses are encountered past the middle of the servo sector, counter 24 will begin to count down, with counter 24 stopping with a positive count therein. This is shown graphically in FIG. 3A, with counter 24 stopping with a positive count of 50, indicating a positive position error. This is a digital position error signal (PES) which appears on counter output lines 24b and is stored for use as a correcting PES to the servo system as the head traverses the following data portion of the disk.

FIG. 3B illustrates the operation of the circuitry where a negative position error condition exists and counter 24 counts up for less than half a servo sector and counts down for more than half the servo sector, resulting in the generation of a negative PES for use in the track following servo system.

Some of the advantages of the present slant track sector servo pattern are: It is linear over the full range of position and uses the recording channel read detector for detection of bits. By its use, position is resolved using half amplitude data with a signal-to-noise ratio remaining constant at all positions. Position is resolved using digital logic and position is determined using the time of an occurrence rather than analog amplitude. The pattern is compact, using locally related bits rather than sequential bursts as in quadrature patterns.

I claim:

1. A system for use in track following servo operations on a rotating magnetic disk where sectors of servo information are interspersed on said disk with data track portions, said servo information and said data being read by the same magnetic head, said servo sectors containing alternate first and second servo tracks having magnetic transitions which are spaced from each other in adjacent tracks, said servo tracks being recorded on said disk at a slant with respect to said data tracks,
   the centerline of each of said servo tracks corresponding to the centerline of one of said data tracks at the beginning of each servo sector,
   the centerline of each of said slanted servo tracks corresponding to the centerline of a different one of said data tracks at the end of each servo sector,
   first detector means for detecting signals read by said head as it passes across said servo sector, and
   digital means for measuring time relationships between signals from said first and second servo tracks during the rotation of said servo sector past said head to provide a measure of the amount and direction of the displacement of said head from said data track centerline.

2. Apparatus in accordance with claim 1, including second detector means connected to said first detector means for detecting which of said first and second tracks said detected signal has been reproduced from.

3. Apparatus in accordance with claim 2 in which said digital means includes a bidirectional counter.

4. Apparatus in accordance with claim 3 in which a bidirectional counter counts in one direction when only pulses from one of said first or second servo tracks is encountered, said counter reversing direction when pulses from both said first and second servo tracks are encountered, and said counter stopping at the end of said servo sector, the count residing in said counter after stopping being a measure of the amount and direction of the displacement of said head from said data track centerline.

* * * * *